United States Patent [19]

MacLaughlin et al.

[11] Patent Number: 4,571,281
[45] Date of Patent: Feb. 18, 1986

[54] BRAKING APPARATUS FOR SPINWELDING MACHINERY

[75] Inventors: Donald MacLaughlin, Midland, Mich.; Vincent E. Fortuna, Huntington Beach, Calif.

[73] Assignee: Cosden Technology, Inc., Dallas, Tex.

[21] Appl. No.: 686,637

[22] Filed: Jan. 2, 1985

Related U.S. Application Data

[63] Continuation of Ser. No. 337,450, Jan. 6, 1982, abandoned.

[51] Int. Cl.$^4$ .................. B23K 27/00; B32B 31/00
[52] U.S. Cl. .................. 156/580; 188/74; 188/85; 188/196 M
[58] Field of Search .................. 188/72.7, 74, 153 R, 188/196 M, 206 R, 217, 51, 53, 54, 56, 55, 28, 85; 156/73.5, 580.1, 580; 74/816, 817

[56] References Cited

U.S. PATENT DOCUMENTS

| Re. 29,448 | 10/1977 | Brown et al. | 156/73.5 |
| 384,507 | 6/1888 | Brown | 188/217 X |
| 1,513,532 | 10/1924 | Church | 188/85 |
| 1,580,584 | 4/1926 | Church et al. | 188/85 X |
| 1,657,541 | 1/1928 | Livermore | 188/74 |
| 1,806,214 | 5/1931 | Perry | 188/217 X |
| 2,161,683 | 6/1939 | Rusnak | 188/74 |
| 2,979,164 | 4/1961 | Altherr | 188/72.7 X |
| 2,990,918 | 7/1961 | Bonner | 188/85 X |
| 3,554,331 | 1/1971 | Pollinger | 188/74 |
| 3,613,983 | 10/1971 | Gage | 156/73.5 X |
| 3,720,836 | 3/1973 | Donges et al. | 250/108 FS |
| 3,759,770 | 9/1973 | Brown et al. | 156/73 |
| 3,800,376 | 4/1974 | Whyte | 128/83.5 |
| 3,819,339 | 6/1974 | Takagi et al. | 156/73.5 X |
| 3,847,014 | 11/1974 | Mistarz | 73/49.3 |
| 3,999,365 | 12/1976 | Suzuki | 188/74 X |
| 4,036,329 | 2/1977 | Anderson | 188/72.9 X |
| 4,075,820 | 2/1978 | Standley | 156/73.5 X |

FOREIGN PATENT DOCUMENTS 990031 6/1976 Canada .................. 156/73.5

*Primary Examiner*—George E. A. Halvosa
*Attorney, Agent, or Firm*—Schwartz, Jeffery, Schwaab, Mack, Blumenthal & Evans

[57] ABSTRACT

Disclosed is an integral braking device for braking a live tool or spindle in a spinwelding machine. The device comprises a cam-activated, spring-loaded brake adapted to bear against a wear resistant braking surface. The brake is both adjustable and self-adjusting and will not interfere with the free rotation of the spindles when not actuated by the cam.

16 Claims, 5 Drawing Figures

BRAKING APPARATUS FOR SPINWELDING MACHINERY

This application is a continuation of application Ser. No. 337,450, filed Jan. 6, 1982, now abandoned.

BACKGROUND OF THE INVENTION

1. Field of the Invention

This present invention relates to a braking device and more particularly to a braking device for thermo-plastic friction welding machines. The present invention also relates to an integral braking means for braking a live tool or spindle.

2. Background of the Invention

In the art of joining thermo-plastic articles by friction welding, a device may be used which spinwelds thermo-plastic axially mating sections. The sections are driven in rotation relative to each other and then axially abutted in mating relationship. In a device such as that disclosed in U.S. Pat. No. Re. 29,448, one of the two mating sections is chucked to an inertial member which is brought up to speed by a rotary drive. The rotary drive is uncoupled as the sections are moved into axial abutment and the braking of the inertial member by the axial abutment of the sections is transformed into frictional heat which welds the thermo-plastic seams to each other.

The apparatus described above may typically be a part of a larger apparatus such as that disclosed in U.S. Pat. No. 3,800,376 for performing a plurality of successive operations with individual container sections.

The processing operations may typically include the dispensing of container sections and the assembly, filling and sealing of the containers. On a single platform, a plurality of spaced processing units may be rotatably mounted. Each unit will typically include a plurality of circumferentially spaced carrier stations for moving container sections or containers about the unit's axis of rotation. A plurality of spaced star wheel transfer units may then be disposed intermediate and adjacent to the processing units. The star wheels receive container sections or containers from and deliver them to the processing units at transfer zones defined generally tangentially of each of the processing units and an adjacently disposed star wheel unit. A transfer unit may be rotatably mounted on the platform and may include a plurality of circumferentially spaced carrier stations for moving the container sections or containers about the axis of rotation. The circumferential spacing of the carrier station on the transfer and processing units will typically be substantially the same throughout; and the transfer and processing units are geared together for simultaneous rotation, with the carrier stations of each of the processing units and an adjacently disposed transfer unit rotating in opposite angular directions. The initial processing units will typically have dispensers for supplying individual container sections to an adjacent transfer unit.

In addition, the invention may be useful with a friction welding machine for joining thermo-plastic container top and bottom parts which are moved continuously along a production line as disclosed in U.S. Pat. No. 3,759,770. Star wheel loading and unloading members incorporating suction pads for gripping the parts as they move to the holders where flutes, in at least some of the holders, communicate the suction chambers in the holders with a vacuum source, and also hold the parts during the friction welding operation may be used.

Alternatively, the invention may be useful in connection with a device such as that disclosed in U.S. Pat. No. 3,720,836 wherein a pedestal assembly for accurately receiving and positively capturing a lower thermo-plastic container half when it is being transferred into and rotated by a spin welding apparatus is disclosed. The spin welding apparatus frictionally joins the lower container half to an upper container half to form a unitary container. The lower container half is received by the pedestal assembly from a rotating star wheel transfer device which slides the lower container half onto a stage portion of the assembly. The pedestal assembly having the container half thereon is then rotated in an opposite direction from that of the star wheel transfer device. The pedestal assembly including the stage portion has a dome-shaped upper surface which cooperates with a complementary recessed bottom of the lower container half. Vacuum means are applied through a central opening in the pedestal assembly for aiding in the positive capture of the lower container half.

Other devices where the present invention may find applicability are disclosed in U.S. Pat. No. 3,216,874 to G. W. Brown; U.S. Pat. No. 3,220,908 to G. W. Brown et al; U.S. Pat. No. 3,316,135 to G. W. Brown et al; U.S. Pat. No. 3,499,068 to G. W. Brown; U.S. Pat. No. 3,607,581 to G. A. Adams; U.S. Pat. No. 3,669,809 to G. W. Brown; U.S. Pat. No. 3,701,708 to G. W. Brown et al; U.S. Pat. No. 3,708,376 to R. J. Mistarz et al; U.S. Pat. No. 3,726,748 to R. J. Mistarz et al; U.S. Pat. No. 3,726,749 to R. J. Mistarz et al; U.S. Pat. No. 3,744,212 to R. J. Mistarz et al and U.S. Pat. No. 3,847,014 to R. J. Mistarz. It will be appreciated by the artisan that the control system of the present invention and the method by which it operates can be adapted to other devices as well.

In general, during the spinwelding process, welds are produced by the storage of kinetic energy in the driving tool. When the two functional surfaces to be welded are brought into intimate contact, the kinetic energy is dissipated in the form of heat, thus resulting in fusion or welding of the surfaces brought together.

For purposes of the description which follows, a defective weld is defined as a failure to create a bond of adequate strength, usually due to a failure of either a loss of one of the surfaces to be welded through, for instance, a missing component or an inproper fit; or a mechanical failure of a driving tool or the driven position of one of the components to be welded.

When such a failure occurs and the tool or spindle continues to rotate, it becomes difficult to load another component onto the spindle. The moving spindle should be at rest when the component is loaded to prevent the likelihood of its flying off the rotating tool surface which may be rotating as fast as 2000 rpm. The prior art lacks a device for the integral braking of the spindle or tool on which the containers are carried in order to stop the rotation of the spindle so that the new container section may be loaded onto the spindle while it is at rest.

OBJECTS AND SUMMARY OF THE INVENTION

Accordingly, it is an object of the present invention to provide an apparatus for braking a rotating tool.

It is still a further object of the present invention to provide an integral braking device for stopping a tool or spindle in which a product such as a container section is to be placed prior to placing the product thereon.

To achieve the foregoing and other objects and in accordance with the present invention, as embodied and broadly described herein, the invention may comprise a braking device for single or multiple spindle spinweld machines having a brake means associated with each spindle. Where there is a top and bottom spindle, the invention will preferably provide a braking means for each one. The brake means of the invention is preferably cam-operated to time the braking action to occur prior to the loading of a product or a component onto the spindle.

The braking means may preferably comprise a cam-actuated, spring-loaded brake adapted to bear against a wear-resistant braking surface and which is self-adjusting and adjustable and which will not jam the spindles.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE PREFERRED EMBODIMENTS

Figure 1:
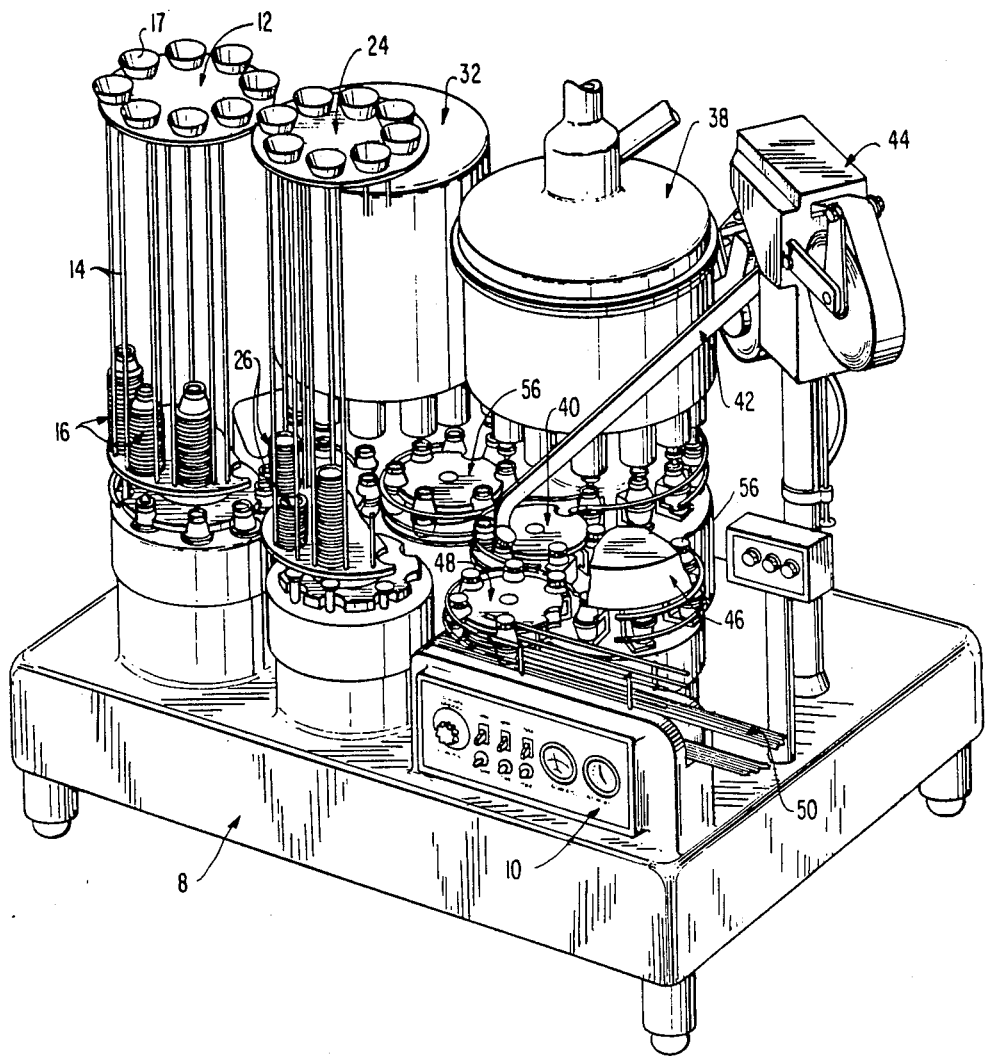
FIG. 1 is a perspective view of a machine for dispensing upper and lower plastic container halves from nested stacks thereof which may be used with the system of the invention, joining these container halves together to make containers, filling the containers, and affixing caps onto the tops of the containers.
Figure 2:
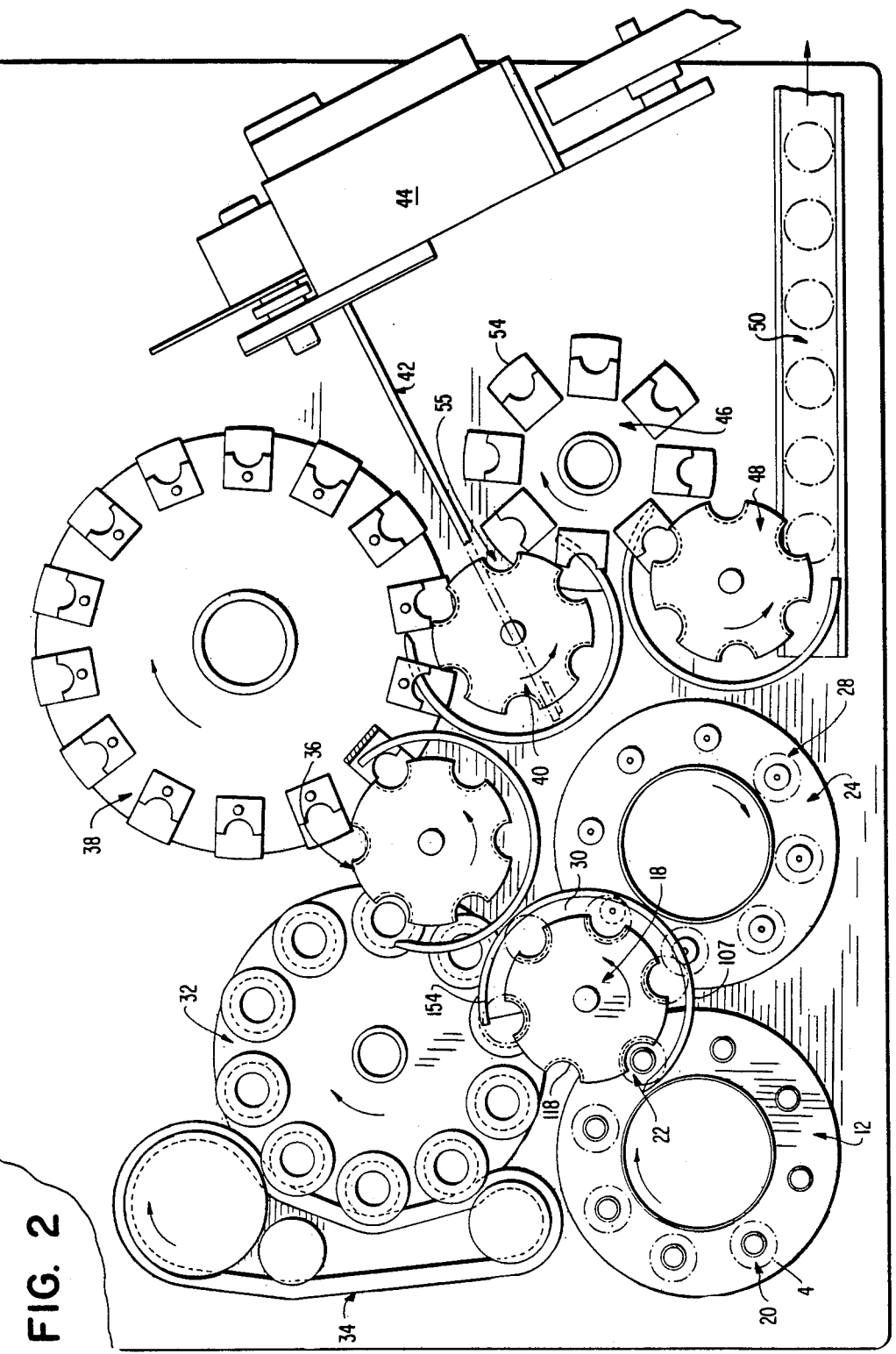
FIG. 2 is a somewhat diagrammatic plan view of the machine of FIG. 1.
Figure 3:
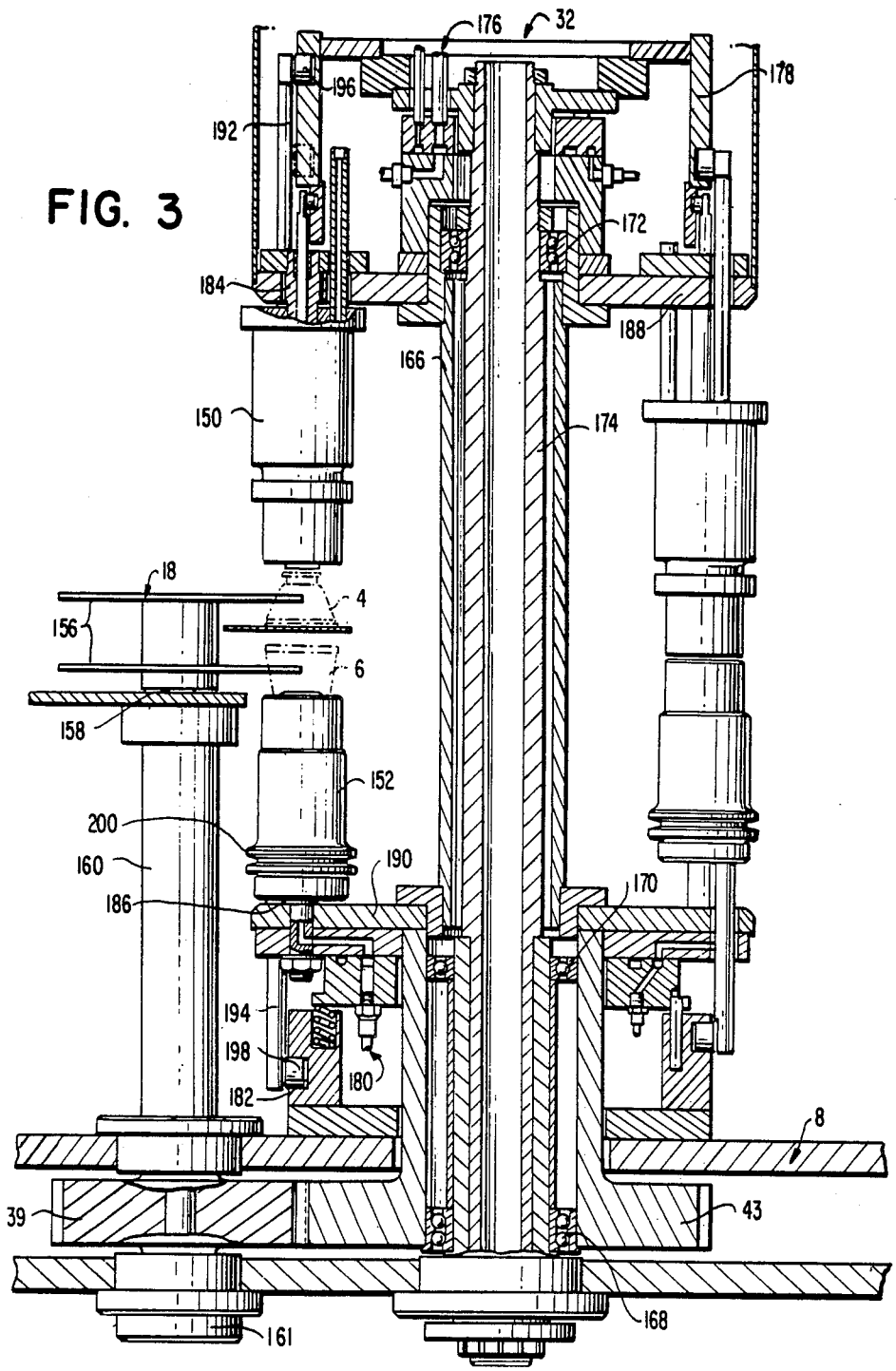
FIG. 3 is a vertical cross-sectinal view through the spinwelding unit of the machine of FIGS. 1 and 2.

It will be helpful at the outset to generally describe the overall construction and operation of a spinwelding machine with which the present invention may be used. It should be understood that the details of the spinwelding machine described below are exemplary only and the braking device of the present invention may be used with other machines as well. One exemplary machine is illustrated in FIGS. 1, 2 and 3. This machine assembles plastic containers with bulk supplies of nested container halves, fills the containers, and caps and seals the open tops of the filled containers.

The containers are assembled from separately fabricated container top halves 4 and container bottom halves 6, with the two halves of each container being frictionally welded together at the middle of the container.

The machine is in the form of a base or table structure 8 carrying hereon a control panel 10, a series of processing units and means for transferring the container portions to and from the various processing units. The processing units and the transfer means are driven by intermeshing gears corresponding in location to the configuration shown in FIG. 2. Preferably, a single drive unit may be employed to impart rotational movement to each drive gear and to each corresponding processing unit and transfer means. Also, the pitch line circles of the intermeshing gear drives preferably are in alignment with the circles formed by joining the centerlines of the container halves and the containers as they travel throughout the system. The processing units are all rotatable units, and transfers between units are accomplished through rotating star wheels, permitting the compact and efficient arrangement indicated in FIG. 1 of the drawings.

The upper and lower container halves 4 and 6, respectively, are delivered from the star wheel device, 18 into alignment with the centerlines of an upper cylindrical mandrel 150 and a lower cylindrical mandrel 152. The mandrels are mounted for movement in a circular path about the central axis of the spin welder 32 (FIG. 3). The transfer takes place at an angular zone where the star wheel periphery moves into a position of tangency to the path followed by the several upper and lower mandrels. This transfer is assisted by conventional stationary guide rails 154 as illustrated in FIG. 2. The end portions of the guide rails 54 intersect the path of the container halves on the star wheel 18 and cause the container halves to move onto the mandrels rather than permitting them to continue to move about the axis of the star wheel.

The star wheel device 18 includes upper and lower generally circular plates 156 having general semicircular, even circumferentially spaced cutouts 118 at their peripheries for engaging the outer peripheries of the container halves 4 and 6. The cutout portions of the upper and lower plates are superposed and the pairs of superposed cutout zones comprise carrier stations of the star wheel device 18. The plates 156 are carried by a shaft 158 extending through a stationary cylindrical member 160 and being connected at its lower end portion to a drive gear 39. This shaft 158 is journalled within bearing means carried by the frame or table 8 and indicated generally at 161 in FIG. 3.

The spin welder drive gear 43 is attached to a hollow drive shaft 166 extending upwardly about the center of the spin welder unit 32. This hollow shaft is rotatable about bearing means 168, 170, and 172 which are located between a stationary vertical shaft 174 and the hollow drive shaft 166.

At its upper end the center stationary shaft 174 supports a stationary vacuum supply means generally indicated at 176 and an annular cam track 178. The platform 8 also has as a part thereof a vacuum supply shown generally at 180 and an annular cam track 182.

It would be helpful at this point to describe generally the spinwelding operation to form a basis for the detailed description which follows. The container halves, once aligned with the centerlines of the upper and lower spindles or mandrels 150 and 152, are surrounded by the spindles for subsequent spinning. The spindles rotate about the central axis of the spinwelder 32 and also move vertically toward each other when surrounding the container halves. The lower spindle 152 which surrounds the bottom half additionally rotates about its own axis during the spinning operation. Once the container halves are frictionally welded, the spindles are caused to separate and free the surrounded joined container.

Each of the spindles is moved vertically on a shaft which is stationary with respect to its own axis but which revolves about the central axis of the spinwelder unit 32. The shafts for the upper spindles or mandrels 150 are designated 184 and the shafts for the lower spindles or mandrels 152 are designated 186. Each upper spindle shaft 184 extends downwardly from a support member 188, and each lower spindle shaft 186 extends upwardly from a support member 190. These support members 188 and 190 are carried by main rotating shaft 166 at the center of the spinwelder, so that the spindle shafts 184 and 186 revolve about the central axis of the spinwelder 32. The rotational movement of the shafts 184 and 186 about the spinwelder central axis causes the spindles 150 and 152 to rotate therewith.

Vertical movements of the spindles with respect to their shafts 184 and 186 are achieved by means of connecting rods 192 and 194 operatively connected to the spindles 150 and 152, respectively. These connecting rods have cam followers cooperating with the previously mentioned stationary cam tracks to vertically position the upper and lower spindles as they rotate about the central axis of the spinwelder 32. The upper connecting rod 192 has cam follower 196 thereon for traveling within the stationary upper cam track 178. The lower connecting rod 194 also has a cam follower 198 associated therewith for movement within the lower cam track 182.

Each lower spindle 152 is additionally capable of spinning about the axis of its shaft 186 when a pulley area 200 thereof is brought into contact with the spinwelder driving belt 34 (FIG. 2) during a predetermined number of degrees of the rotation of the mandrel about the central axis of the spinwelder 32. For this purpose, bearing means (not shown) are interposed between each spindle 152 and its shaft 186.

The upper vacuum supply indicated generally at 176 is suitably connected to a vacuum port which feeds to the periphery of a central opening (not shown) within the upper mandrel. The shape of this opening conforms generally to the shape of the upper container half 4. The vacuum is applied about the outer periphery of the container half 4 when it is being surrounded by the upper spindle 150.

Figure 4:
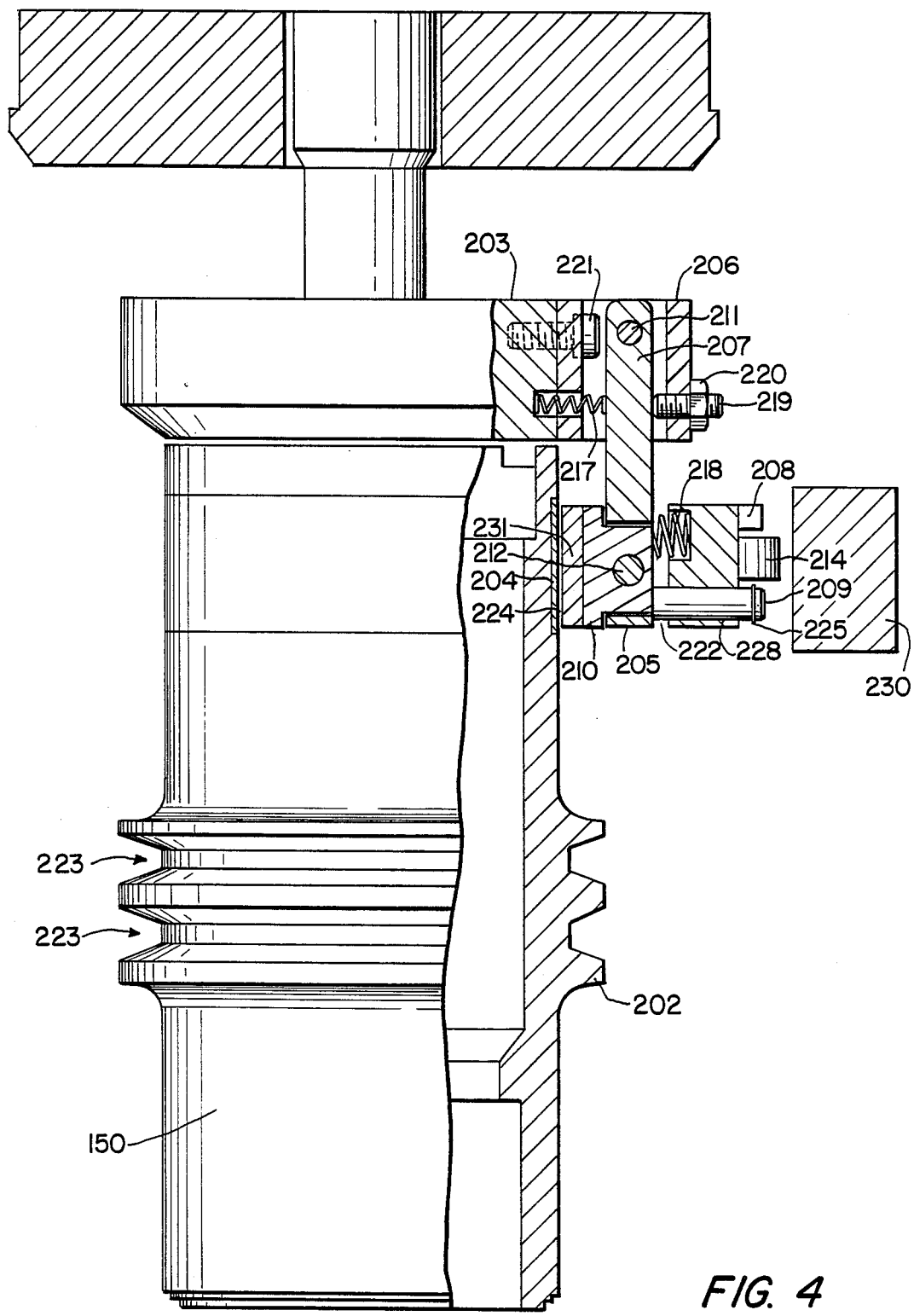
FIG. 4 is a vertical cross-section of top tooling subassembly of FIG. 3 showing the brake means in cross-section.
Figure 5:
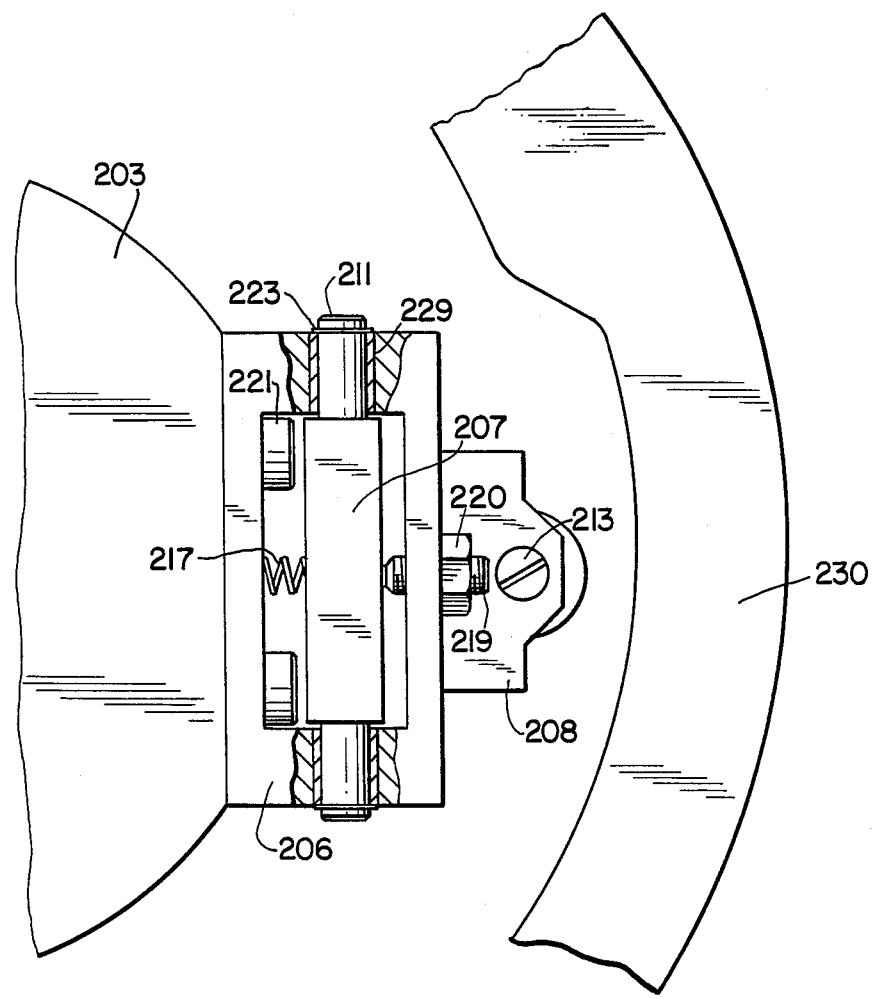
FIG. 5 is a cross-section across section line A—A of FIG. 4.

Turning now to FIGS. 4 and 5, there is depicted a vertical and top cross-section, respectively, of the braking device of the present invention in connection with a top tooling or spindle subassembly such as that of FIG. 3. It should be understood that a similar assembly can be used to break the lower tooling or spindle assembly 152 of FIG. 3 and that a braking assembly can be provided for each rotating tool on the spinwelding machine.

The rotating tool or spindle 150 of FIG. 4 may be driven by a single belt as shown in FIG. 3 or by a plurality of belts that engage belt grooves 223 of FIG. 4. It should be understood that if no load or braking is applied to the spindle or tool 202, it will continue to rotate making it difficult to load a component on it. The compoent will have a tendency to "fly" off of a rotating spindle. In order to properly load the spindle, it should be at rest.

In order to equip the spindle 150 with a braking assembly, a flat surface 203 is provided on the side of a stationary surface associated with the spindle. This may be done by machining or other similar method. The numeral 202 denotes the spindle shell in which is provided with a stainless steel or other wear-resistant band or rubbing strip 204 against which a brake shoe 231 will bear. The wear-resistant material 204 is provided since preferably the spindle is made of aluminum which will not tolerate the wear it would experience as a breaking surface.

The brake assembly is mounted by a brake mount 206 which is bolted or otherwise attached to the surface 203 by means of bolts or other fasteners 221. Pivotingly supported by pivot pin 211 within the brake mount 206 is the brake arm 207. The brake arm 207 is urged against set screw 219 and locknut 220 by return spring 217. The position of brake arm 207 is adjusted by means of the set screw 219 and locknut 220 so as to adjust the clearance 224 between the rubbing strip 204 and the brake shoe 231.

The brake is activated by a timing cam 230 which contacts the cam roller 214 which in turn is fixedly attached to the brake block 208. The brake block 208 is slidingly supported on the guide rod 209 which extends from the brake shoe holder 210. A clearance 222 is maintained between the brake block 208 and the brake shoe holder 210 by means of a compression spring 218, whose force must be overcome before any braking force will be applied by the brake shoe 231 against the rubbing strip 204. In this way, potential jamming of the brake against the spindle is obviated. The brake shoe holder 210 pivots about brake shoe holder pivot 212 to ensure that the brake shoe always presents a flat surface to the spindle and more particularly to the rubbing strip 204. This double pivot arrangement permits the brake shoe to move to the left (as viewed in FIG. 4) while preventing the brake shoe from rotating clockwise and only contacting the spindle with its bottom surface. Roller pin 213 is provided for the cam roller 214 and is journalled between bearing surfaces provided it in the brake block 208. Retaining ring 225 is provided to prevent the brake block 208, which slides on guide rod 209, from escaping. In addition, a bushing 228 is provided in the brake block 208 through which the guide rod 209 fits. Another bushing 229 is provided for pivot pin 211 in the brake mount 206.

The brake shoe is attached to the brake shoe holder by an appropriate cement or other suitable means.

In operation, the cam will rotate into position to apply the brake prior to the time the spindle is to be loaded. The cam contacts the cam roller 214 which is secured to the brake block 208 by means of the cam roller pin 213. Under the influence of the cam 230, the brake block 208 moves to the left along guild rod 9 until it overcomes the force of the compression spring 18 and travels the distance of the gap 222. At that point, the brake body 208 contacts the brake shoe holder 210 which is pivotingly supported on brake arm 207 by means of pivot pin 112. The brake arm 207 is also pivotingly supported on pivot pin 211 so that the entire assembly can pivot to the left with the brake shoe 210 remaining square to the braking surface 204 of the spindle 150.

The clearance 224 between the brake shoe 210 and the braking surface 204 can be adjusted by means of set screw 219 and locknut 220 to ensure proper braking action.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A brake device for periodically braking a rotating spindle of a multi-spindle spinwelder, comprising:
   (a) a brake arm pivotingly supported at one end on a stationary member of said spinwelder adjacent an axial end of said spindle, said brake arm being arranged to extend substantially axially parallel to said spindle;
   (b) a brake shoe means pivotingly supported by said brake arm at another end thereof, positioned opposite said rotating spindle;
   (c) a cam follower means resiliently supported in a rest position spaced from said brake shoe means;
   (d) a rotating generally annular timing cam coaxially surrounding said spindle outside of and adjacent said cam follower and having a radially inwardly projecting portion for periodically engaging said cam follower means to move said cam follower means from said rest position to engage said brake shoe means and to apply a braking force against said rotating spindle to periodically arrest the rotation of said spindle.

2. The braking device of claim 1, further including means to adjust the position of said brake arm.

3. The braking device of claim 2, wherein said means to adjust the position of said brake arm includes a set screw, a locknut positioned on one side of said brake arm and an opposing return spring.

4. The apparatus of claim 1, wherein said brake shoe means further comprises a brake shoe holder having on a face thereof a brake shoe.

5. The apparatus of claim 4, wherein said brake shoe means further includes a guide rod extending from said brake shoe holder for engaging said cam follower means.

6. The apparatus of claim 1, wherein said cam follower means further includes a cam roller, a roller pin for supporting said cam roller, and a brake block for supporting said roller pin.

7. The apparatus of claim 6, wherein said brake block further comprises a bore having a bushing therein, said bore receiving a guide rod extending from said brake shoe means.

8. The apparatus of claim 7, further including a compression spring positioned between said brake shoe means and said brake block for maintaining a gap between said brake shoe means and said brake block when the braking apparatus is inactive.

9. An apparatus for periodically braking a rotating spindle of a multi-spindle spinwelder, said spindle having a rubbing surface, said apparatus comprising:
   (a) a brake mount including a pivot pin for mounting said apparatus to a stationary surface of said spinwelder adjacent said spindle;
   (b) a spring biased brake arm, one end of which is pivotingly supported in said brake mount by said pivot pin, said brake arm being arranged substantially axially parallel and adjacent to an axial end of said spindle;
   (c) a brake shoe means pivotingly carried by another end of said brake arm and having thereon a brake shoe for engaging said rubbing surface of said rotating spindle, said brake shoe being normally spaced from said rubbing surface by said spring biased brake arm;
   (d) brake activating means resiliently spaced from said brake shoe means when said apparatus is inactive; and
   (e) a rotating generally annular timing cam coaxially surrounding said spindle outside of and adjacent said brake activating means and having a radially inwardly projecting portion operable to periodically engage said brake activating means to overcome the spring bias of said brake arm to apply said brake shoe against said rubbing surface to periodically arrest the rotation of said rotating spindle.

10. The apparatus of claim 9, wherein said brake activating means comprises a cam roller, a cam roller pin for supporting said cam roller, a brake block for supporting said cam roller pin, said brake block being mounted on a guide rod extending from said brake shoe means, means to retain said brake block on said guide rod, and a compression spring positioned between said brake body and said brake shoe means for maintaining said brake shoe means in a spaced relationship when said apparatus is inactive.

11. The apparatus of claim 10, further including an adjustment means for adjusting a gap between said brake shoe and said rubbing surface.

12. The apparatus of claim 11, wherein said adjusting means comprises a set screw for setting the position of said brake arm, a locknut for locking the set screw and an opposing return spring for urging the brake arm against said set screw.

13. The apparatus of claim 9 wherein said spring is disposed between said brake arm and said stationary surface.

14. A spinwelder for forming spinwelded containers from at least two container components, said spinwelder having at least one spindle rotating about an axis and a braking device for periodically braking said rotating spindle for loading one of said components on said spindle, said braking device comprising:
   a brake shoe, pivotally mounted opposite said spindle, said brake shoe being normally spaced from said spindle and operable to engage an axial segment of the surface of said spindle upon the application of a braking force;
   a cam activated braking force applying means lying in a plane substantially parallel to said axis for transmitting a braking force to said brake shoe;
   a rotating generally annular timing cam, positioned coaxially surrounding said spindle outside of and adjacent said braking force applying means, and having a radially inwardly extending portion for activating said braking force applying means to brake said rotating spindle in synchronism with loading a container component on said spindle.

15. The spinwelder of claim 14, wherein said axial segment has a wear resistant braking surface and said pivotally mounted brake shoe is operable to engage a braking surface substantially axially parallel to said wear resistant braking surface to prevent uneven wear of said braking surface and said brake shoe.

16. The spinwelder of claim 15 wherein said braking force applying means comprises a spring loaded brake block mounted to move in said substantially perpendicular direction and having a cam roller for engaging said timing cam.

* * * * *